US012761471B2

(12) United States Patent
Miller et al.

(10) Patent No.: US 12,761,471 B2
(45) Date of Patent: Oct. 13, 2026

(54) GRADED INDEX STRUCTURE FOR OPTICAL COMPONENTS WITH REDUCED POLARIZATION ABERRATIONS

(71) Applicant: Arizona Board of Regents on Behalf of the University of Arizona, Tucson, AZ (US)

(72) Inventors: Sawyer Miller, Tucson, AZ (US); Linan Jiang, Tucson, AZ (US); Stanley Pau, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 161 days.

(21) Appl. No.: 18/854,395

(22) PCT Filed: Apr. 5, 2023

(86) PCT No.: PCT/US2023/017538
§ 371 (c)(1),
(2) Date: Oct. 4, 2024

(87) PCT Pub. No.: WO2023/196381
PCT Pub. Date: Oct. 12, 2023

(65) Prior Publication Data

US 2025/0370254 A1 Dec. 4, 2025

Related U.S. Application Data

(60) Provisional application No. 63/327,712, filed on Apr. 5, 2022.

(51) Int. Cl.
*G02B 27/00* (2006.01)
*G02B 5/30* (2006.01)
*G02B 27/28* (2006.01)

(52) U.S. Cl.
CPC ....... *G02B 27/0025* (2013.01); *G02B 5/3008* (2013.01); *G02B 27/286* (2013.01)

(58) Field of Classification Search
CPC . G02B 27/0025; G02B 5/3008; G02B 27/286
(Continued)

(56) References Cited

U.S. PATENT DOCUMENTS 5,461,692 A 10/1995 Nagel
10,593,507 B2 3/2020 Hua et al.
(Continued)

OTHER PUBLICATIONS

International Search Report and Written Opinion of the International Searching Authority from International Application No. PCT/US2023/017538 dated Jul. 6, 2023 (11pages).
(Continued)

*Primary Examiner* — William Choi
(74) *Attorney, Agent, or Firm* — ASHURST PERKINS COIE US LLP

(57) ABSTRACT

Methods, devices and systems are described that reduce polarization aberrations in waveguides used in a variety of applications, such as augmented or virtual reality. An example waveguide device includes a cladding with a first index of refraction, and a core with a plurality of layers that can maintain propagation of the polarized beam with multiple total internal reflections (TIRs). Each layer of the core has an index of refraction that is larger than the first index of refraction, and the core has a graded index profile that varies from a higher index at an inner core location to a lower index at an outer location of the core. The core has a predetermined number of layers such that a polarization retardance of the polarized beam for a range of angles of incidence spanning at least 6 degrees, and after a plurality of TIRs, remains less than 10 degrees.

27 Claims, 14 Drawing Sheets

Current invention

(58) Field of Classification Search
USPC .......................................................... 359/637
See application file for complete search history.

(56) References Cited

U.S. PATENT DOCUMENTS

| | | | | |
|---|---|---|---|---|
| 11,280,937 | B2 | 3/2022 | Peroz et al. | |
| 2004/0036985 | A1 | 2/2004 | Mcguire, Jr. et al. | |
| 2006/0274793 | A1* | 12/2006 | Qiu ...................... | G02B 6/1228 372/45.01 |
| 2007/0202319 | A1 | 8/2007 | Bryan et al. | |
| 2017/0196459 | A1 | 7/2017 | Lam et al. | |
| 2018/0088357 | A1 | 3/2018 | Kliner et al. | |

OTHER PUBLICATIONS

Ding, Yitian, "Application of polarimetry to surveillance and underwater imaging", Ph.D. Thesis, Chapter 4, University of Arizona, 2019, 98 pages.

Feng et al. "Compensator design for polarization state management in waveguide displays based on polarization volume gratings," Optics Express, Mar. 15, 2021, 29(6), 7 pages.

Hayfield et al, "Assessment of the suitability of the Drude Tronstad polarized light method for the study of film growth on polycrystalline metals," Misc. Publication, National Bureau of Standards 1964, 256, pp. 157-199.

Landry, John Paul, "Optical oblique-incidence reflectivity difference microscopy: Application to label-free detection of reaction in biomolecular microarrays," Ph.D. Thesis, Appendix B, University of California, Davis, 2008, 24 pages.

Macleod, H.A. "Thin-film Optical Filters," Institute of Physics Publishing, 1986, Bristol and Philadelphia, 667 pages.

Scopelliti et al. "Overcoming the tradeoff between confinement and focal distance using virtual ultrasonic optical waveguides," Optics Express, Dec. 7, 2020, 28(25), 15 pages.

Wang et al, "Graded-index fluoropolymer antireflection coatings for invisible plastic optics," Nano Letters, 2019, 19, pp. 787-792.

Yang et al. "Optical properties of Teflon AF amorphous fluoropolymers," Journal of Micro/Nanolithography, MEMS MOEMS, 2008, 7(3):0330101-0330109 (9 pages).

* cited by examiner

Current invention

GRADED INDEX STRUCTURE FOR OPTICAL COMPONENTS WITH REDUCED POLARIZATION ABERRATIONS

CROSS REFERENCE TO RELATED APPLICATION(S)

This application is a 371 National Stage Application of International Patent Application No. PCT/US2023/017538, filed on Apr. 5, 2023, which claims priority to the provisional application with Ser. No. 63/327,712 titled "GRADED INDEX STRUCTURE FOR OPTICAL COMPONENTS WITH REDUCED POLARIZATION ABERRATIONS," filed Apr. 5, 2022. The entire contents of the above noted applications are incorporated by reference as part of the disclosure of this document.

TECHNICAL FIELD

The technology in this patent document relates to methods and devices that reduce or minimize polarization aberrations in optical components.

SUMMARY

One application of a waveguide display system is in augmented reality (AR) and virtual reality (VR) devices, which provides advantages that include high image quality, transparency, large FOV and compact thin form factor. In a typical configuration for a head-mounted display or near-eye display, a waveguide couples and projects light from a microdisplay such as a liquid crystal based display, a digital micromirror device, a beam scanner, a micro organic light emitting diode (OLED) or a micro light emitting diode (LED) to form a virtual image directed to the human eyes. Depending on the design and application, the waveguide also serves as a combiner and can transmit external light to the human eyes, allowing the user to see both overlay and outside images.

The existing designs, however, include waveguides that introduce polarization aberrations, which must be reduced or eliminated for high performance displays

SUMMARY

The disclosed embodiments relate to methods, devices and systems that reduce or eliminate polarization aberrations in waveguides that are used, for example, in AR/VR devices.

One example waveguide includes a cladding having a first index of refraction, and a core positioned within the cladding and comprising a plurality of layers positioned adjacent to one another, the core configured to accept a polarized beam incident on a facet thereof and to maintain propagation of the polarized beam within the core upon multiple total internal reflections (TIRs). Each layer has an index of refraction that is larger than the first index of refraction, and the indices of refraction of material of the plurality of layers are selected to produce a core with a graded index profile that varies from a higher index of refraction at an inner location of the core to a lower index of refraction at an outer location of the core in vicinity of the cladding. The waveguide is configured to consist of a predetermined number of layers as part of the core such that a polarization retardance associated with the polarized beam (a) for a range of angles of incidence spanning at least 6 degrees, and (b) after a plurality of TIRs is limited to less than 10 degrees.

DETAILED DESCRIPTION

A typical waveguide in a waveguide display is a step index waveguide and operates by total internal reflection (TIR). When light is incident from a high index $n_h$ to a low index $n_l$ material ($n_h>n_l$) at an angle greater than the critical angle $\theta_c$, where $\theta_c=\arcsin(n_l/n_h)$, light is reflected by TIR and is trapped inside the waveguide. For glass-air boundary where $$\frac{n_l}{n_h}\sim 1/1.52,\ \theta_c = 41.1$$

degrees. In addition to reflection, TIR introduces a phase shift and a small lateral shift that is dependent on the wavelength and polarization of light. The exact phase shift is determined by the Fresnel equations and is given by:

$$\phi = 2\tan^{-1}\frac{\sqrt{\sin^2\theta - n^2}}{\cos\theta} - 2\tan^{-1}\frac{\sqrt{\sin^2\theta - n^2}}{n^2\cos\theta} \tag{1}$$

In Equation (1), $n=n_h/n_l$ and $\theta$ is the angle of incidence. The lateral swift can be calculated from equation of the Goos-Hänchen effect. For many applications, the input light is polarized, and propagation inside the waveguide introduces polarization aberration which changes its polarization states. In high performance displays, the polarization state of light must be managed by reducing the polarization aberration of the waveguide. The presence of the Fresnel phase shift has a negative effect on the waveguide display uniformity, in addition to output coupling and polarization multiplexing efficiency.

Figure 1A:
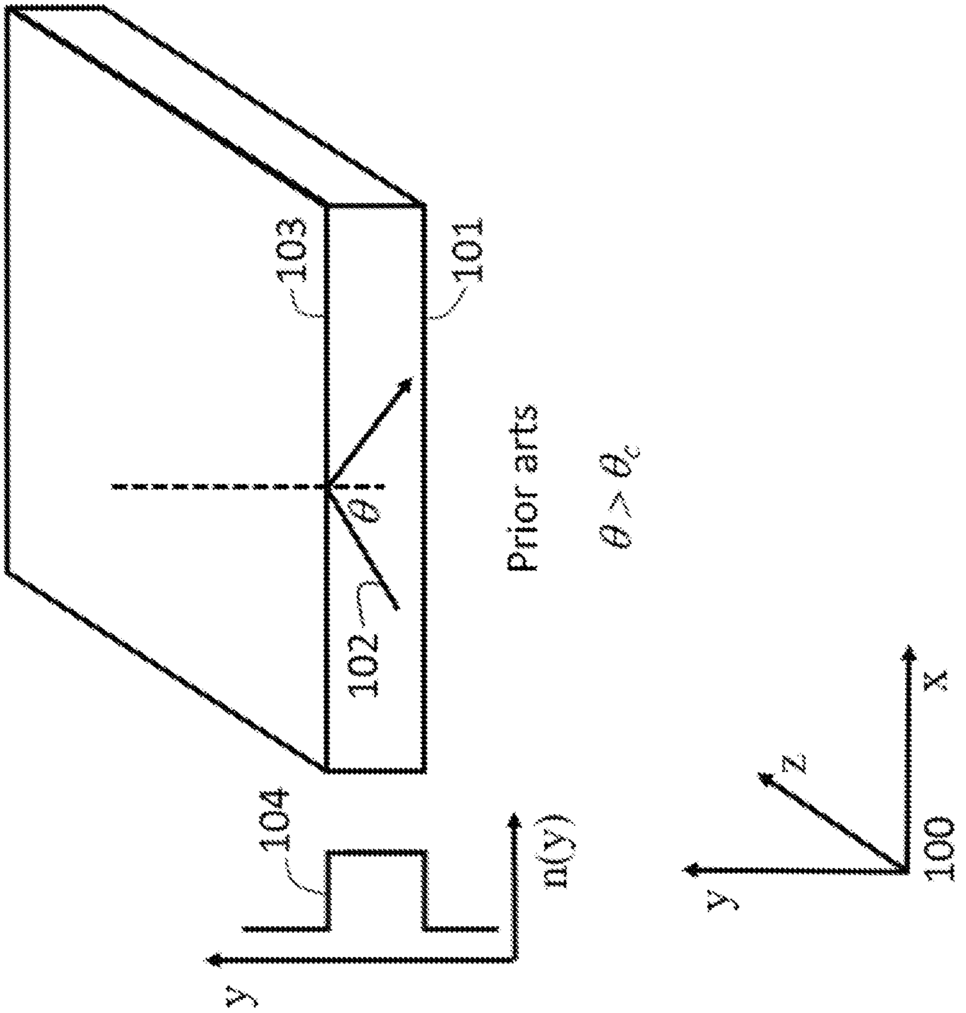
FIG. 1A illustrates an example slab waveguide with a step index profile.

FIG. 1A shows a slab waveguide 101. Light ray 102 is incident at an angle θ onto one facet of the waveguide 103, is reflected from the facet 103 by TIR, and propagates inside the waveguide. The index profile of the waveguide 101 is presented in plot 104 which shows that the waveguide is a step index waveguide.

It is well known that a step index waveguide introduces polarization aberration because of the abrupt change of refractive index at the interface. What is not as well known is that graded index profile does not introduce a phase shift and the corresponding polarization aberration.

Figure 1B:
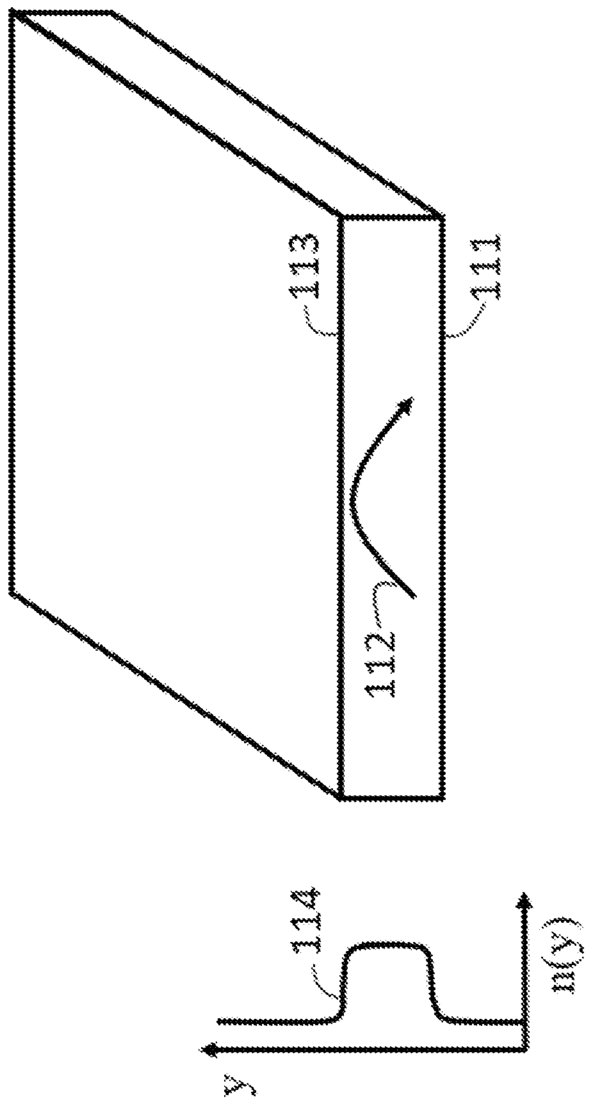
FIG. 1B illustrates an example slab waveguide with a graded index profile.

FIG. 1B shows a slab waveguide 111. Light ray 112 is incident onto one facet of the waveguide 113. The light ray bends upon interaction with the facet 113 and propagates inside the waveguide. The index profile of the waveguide 111 is presented in plot 114 which shows that the waveguide is a graded index waveguide or a step index waveguide with a graded index coating. There is no polarization dependent phase shift introduced in this configuration.

A graded index distribution is commonly achieved by using ion exchange glass, polymer system and chemical vapor deposition. Typical index range, An, is of the order of 0.07 to 0.15, and the formation of the graded index distribution can sometimes lead to stress birefringent such as in the ion exchange glass system. Other techniques to create arbitrary index distribution are nanolaminates, microfabricated subwavelength structures, nanoporous materials and multilayer metamaterials. The ideal graded index material for a waveguide display should have a low optical loss, low dispersion, large Δn and no intrinsic birefringence. One embodiment of a waveguide display is to apply an ultra low index nanoporous fluoropolymer coating on a glass or plastic waveguide substrate, for example on the surface of the facet 113. The coating can include multiple layers of different refractive indices and porosities. In one implementation, the layers can be deposited using thermal evaporation of Teflon AF and small molecule N,N'-bis(3-methylphenyl)-N,N'-diphenylbenzidine (NPD). The small molecule NPD acts as a sacrificial material which can be selectively dissolved and removed in solvent solution after deposition. The refractive index can be tuned from around 1.5 to less than 1.1 by removal of the NPD molecules.

Use of a graded index coating in waveguide applications allows for complete correction of polarization phase shift from TIR. The critical angle between the waveguide core and the waveguide cladding remains the same through the continuity of Maxwell's equations and is demonstrated with Snell's Law.

$$n_0 \sin\theta_0 = n_1 \sin\theta_1 = n_m \sin\theta_m \tag{2}$$

In Equation (2), $n_0$ and $\theta_0$ are the initial index of refraction and angle of incidence in the waveguide core; $n_m$ and $\theta_m$ are the index of refraction and angle of incidence in the mth layer of the graded index coating. Ideally the graded index coating would be continuous from $n_0$ to $n_m$; however, a discrete step size in the index of refraction as a function of layer is required given manufacturing considerations.

Figure 2:
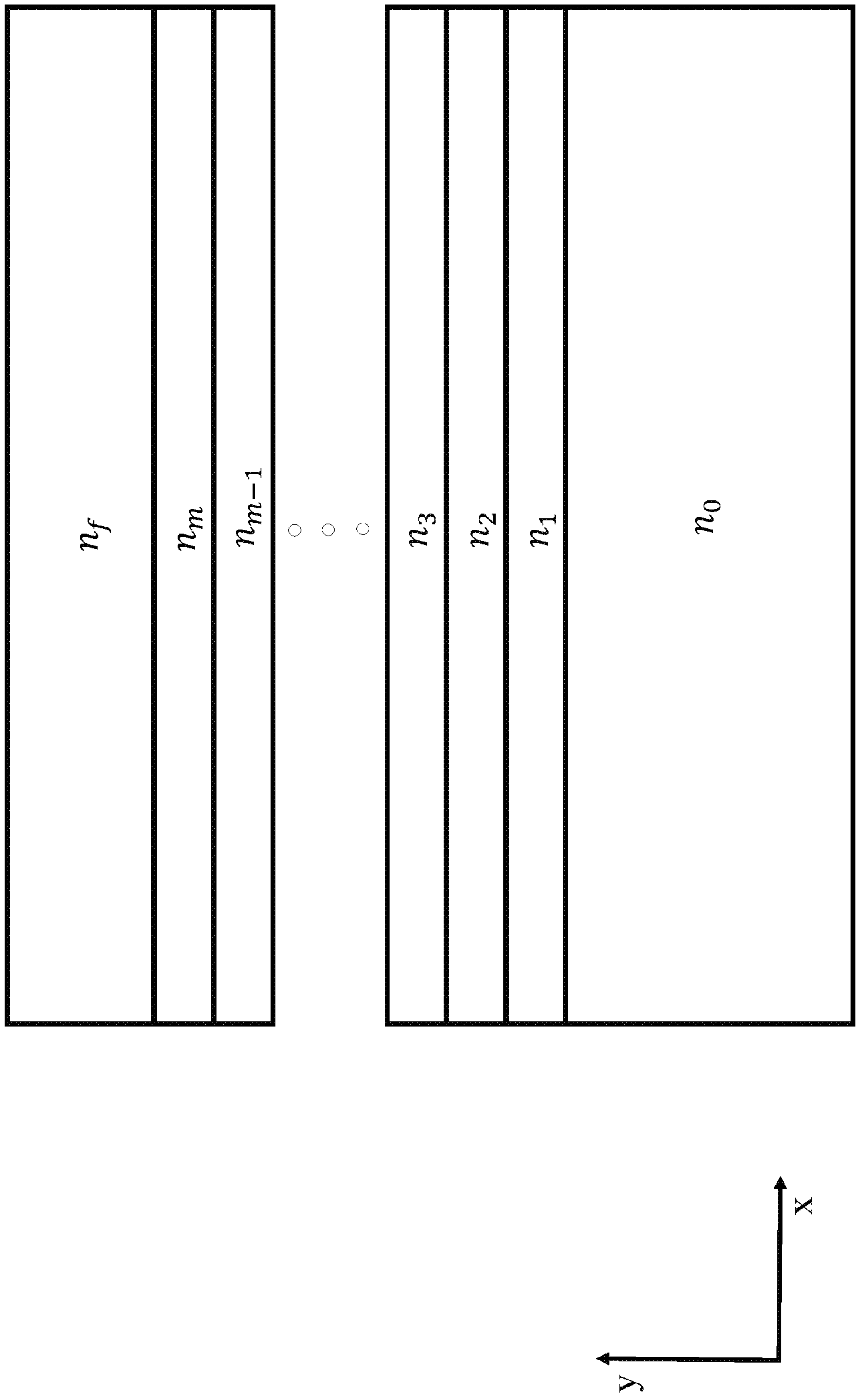
FIG. 2 illustrates an example of an approximated graded index profile.

An example of an approximated graded index profile is shown in FIG. 2. The index of refraction of the core is $n_0$ and decreases with increasing layer until $n_m$ is reached. The index of refraction for the cladding is represented in FIG. 2 as $n_f$.

Figure 3:
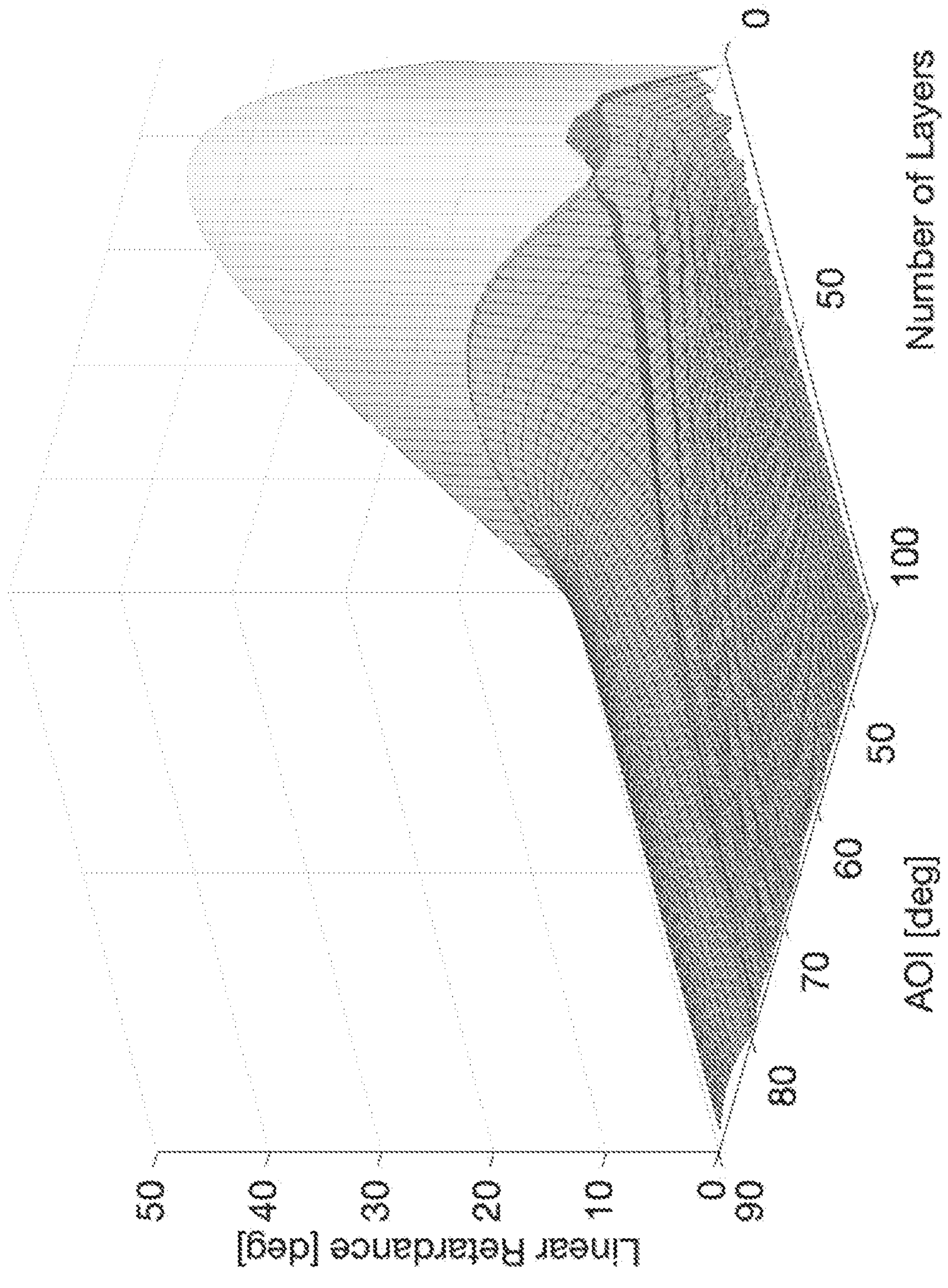
FIG. 3 illustrates an example plot of linear retardance produced with increasing number of layers as a function of angle of incidence (AOI).

To best approximate a gradient index, the number of layers (m) should approach infinity. FIG. 3 shows the linear retardance produced with increasing number of layers as a function of angle of incidence (AOI). Increasing the number of layers flattens the linear retardance curve. It is noted that the indices of refraction for $n_0$ and $n_f$ remain the same as the number of layers increases, only the Δn between adjacent layers decreases. In the ideal case, the linear retardance is zero for all AOIs.

Figure 4:
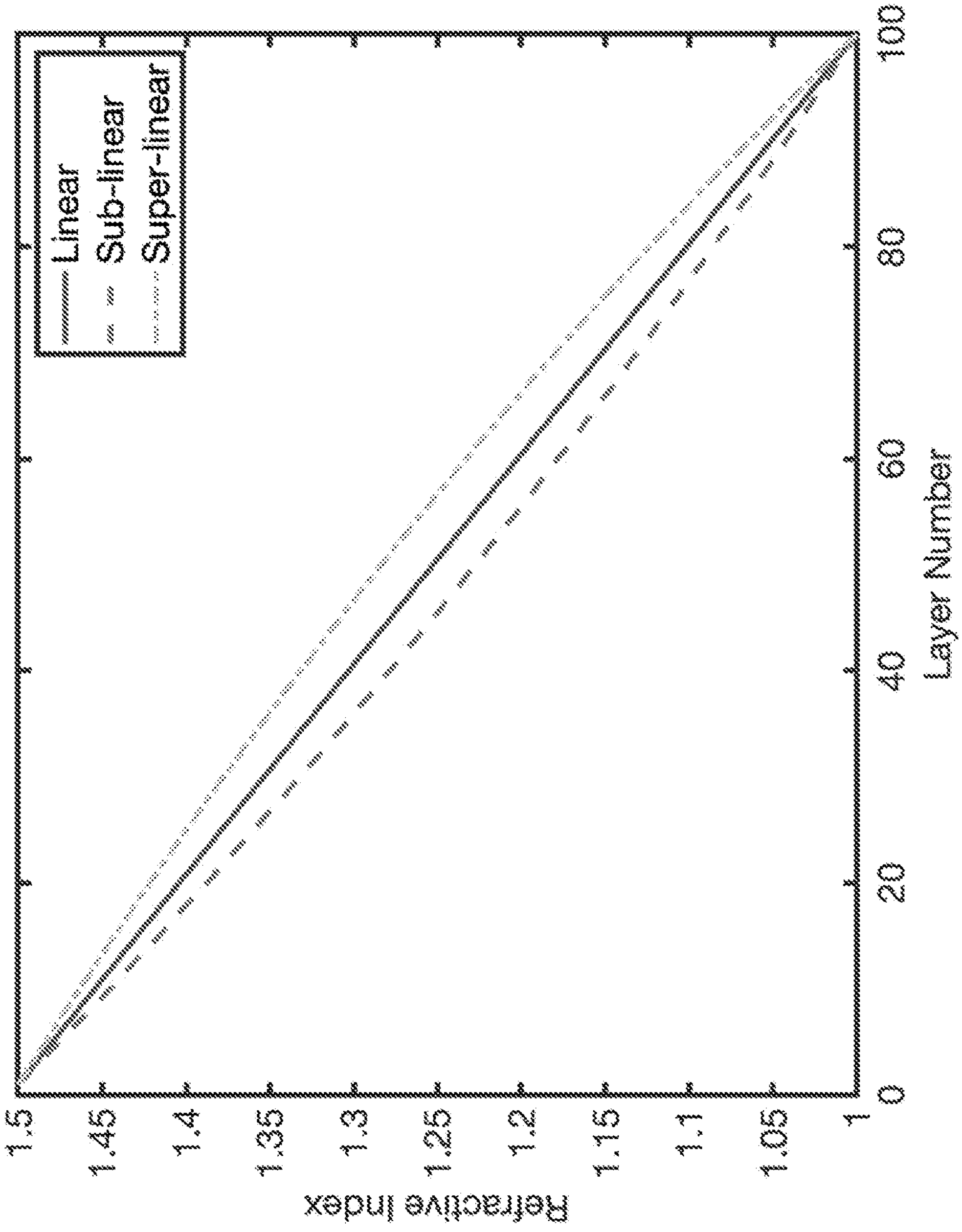
FIG. 4 illustrates three different examples of how the index of refraction is varied as a function of the number of layers in a graded index profile.

Different profiles for index variation as a function of layer number can be modified, as well, to manipulate the resulting linear retardance curve. FIG. 4 details three different examples functional forms of the variation in the index of refraction. The functions can be: (1) linear, (2) sub-linear, such as exponential decay, (3) super-linear, such as a logarithmic distribution, or (4) a combination of the above, such as a general polynomial. For example, a linear index variation profile as applied to FIG. 2 results in a linear change in the indices of refraction as we move from $n_1$ to $n_m$ layers.

Figure 5:
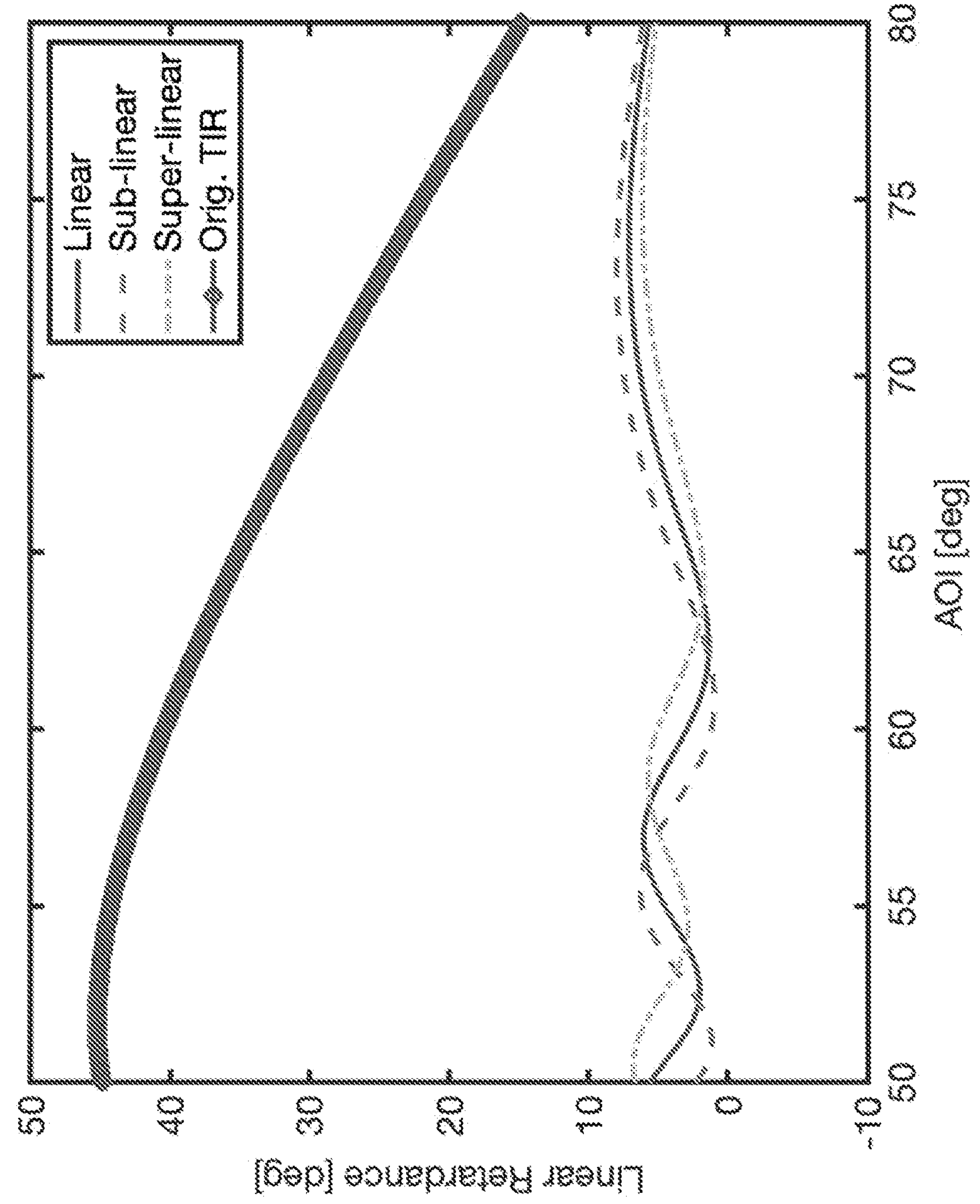
FIG. 5 illustrates example simulations of a 10-layer gradient index coating and the resulting linear retardance produced from total internal reflection (TIR).

FIG. 5 shows example simulations of a 10-layer gradient index coating and the resulting linear retardance produced from TIR. Changing the functional distribution of the gradient index change, with reference to FIG. 4, modifies the extrema of the resulting linear retardance as a function of angle of incidence. As evident from FIG. 5, the graded index structure significantly reduces linear retardance compared to original structure with step index profile over at angles of incidence that span at least 30 degrees. In some embodiments, the range of AOIs fall within an extended range that spans the critical angle (i.e., arcsin ($n_f/n_0$)) and close to 90 degrees (e.g., 89 degrees). Examination of FIG. 5 further reveals retardance variations (e.g., low and high retardance regions) as a function of AOI and the index variation profile. This feature of the graded index structure can be advantageously used in waveguides with known narrow angular acceptance. In particular, the graded index structure can be designed such that the known acceptance angle range of the waveguide coincides with a minimum (or low-valued region) in retardance. For instance, based on the example plots in FIG. 5, for a waveguide with an operating AOI range of 58 to 64 degrees, a sub-linear index distribution can be chosen, which results in a minimum phase shift. In this way, the graded index structure can be designed with fewer layers while maintaining the retardance at a desired low level.

Another feature of the disclosed graded index structures is that, in some embodiments, the layers are formed using the same material. Accordingly, the layers in the graded index structure can be formed using the same material while providing a large index variation (i.e., from core to cladding). In some embodiments, the index can vary in the range 1.3 to 1.7 or 1.1 to 1.7. In an example embodiment, Teflon AF fluoropolymers are used, which have little to no dispersion in the visible region, and wavelength dispersion and feasibility of construction concerns are limited.

Simulations of the approximate graded index were completed in the coherent and incoherent regimes. In coherent regime, the transfer matrix method was utilized. The coherent regime refers to optical systems utilizing narrow spectral bandwidth sources, such as lasers. The transfer matrix method allows for the calculation of the reflection Fresnel amplitude coefficients through the coherent summation of partial waves from m layers with a converging geometric series. For a single layer film, the reflection Fresnel amplitude coefficient is found to be:

$$r_{s|p} = \frac{r_{s|p}^{01} + r_{s|p}^{12} e^{i2\gamma}}{1 + r_{s|p}^{01} r_{s|p}^{12} e^{i2\gamma}} \tag{3}$$

In Equation (3), $r^{01}$ is the reflection Fresnel coefficient between waveguide core and single layer film, $r^{12}$ is the reflection Fresnel coefficient between the single layer film and waveguide cladding, and $\gamma$ is the optical path length through the single layer thin film. Expansion into multi-layer films through matrix methods is detailed in the literature. The retardance produced by the gradient index coating can then be calculated as a function of angle of incidence ($\theta$) and wavelength ($\lambda$) through the relation:

$$\phi(\theta, \lambda) = |\mathrm{Arg}(r_s(\theta, \lambda)) - \mathrm{Arg}(r_p(\theta, \lambda))| \tag{4}$$

In Equation (4), $r_s$ and $r_p$ are the reflection Fresnel amplitude coefficients for the gradient index film stack.

In the incoherent regime, Mueller calculus is used. The incoherent regime refers to optical systems utilizing optical sources which have a broad spectral bandwidth, such as white light sources. The incoherent regime allows for partial waves being incoherently summed, where phase information is not considered. A recursion relation utilizing the reflection and transmission matrices between adjacent layers is developed, allowing for incoherent summation of Stokes parameters. The reflection Mueller matrix for m-layers ($R_m$) can be defined as:

$$R_m = (R - R_{m-1} * R^2 + R_{m-1} * T^2)(1 - R_{m-1}R)^{-1} \tag{5}$$

In Equation (5), R and T are the Mueller matrices describing the Fresnel reflection and transmission between layers m and m−1, respectively, and $R_{m-1}$ is the Mueller matrix describing the total reflection from layers 1 through m−1, thus the recursion relation. The retardance can be calculated from $R_m$ using Equation (6).

$$\phi(\theta, \lambda) = \cos^{-1}\left(\frac{Tr(R_m)}{2} - 1\right) \tag{6}$$

In Equation (6), Tr is the trace operation.

Optimization of the gradient index coating film parameters can occur in the coherent limit using the transfer matrix method and Equation (4) or, in the incoherent limit, using Equations (5) and (6). Each layer has two free variables: (1) thickness ($d_m$) and (2) index of refraction ($n_m$). An example optimization function can be implemented to minimize the linear retardance of the film stack as a function of wavelength using a multivariable non-linear constrained solver. The optimization function can consider the coherence of the optical source and minimize $\phi$ over all angles of incidence.

Figure 6:
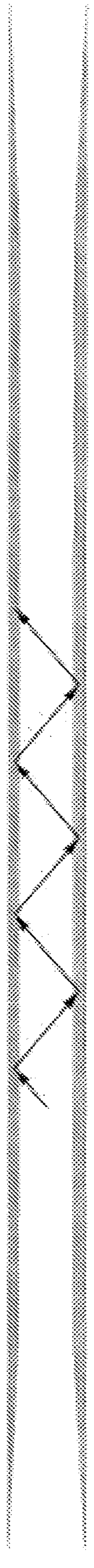
FIG. 6 illustrates an example of a single ray being traced through an example waveguide, illustrating TIR for angles of incidence that are greater than the critical angle.
Figure 7:
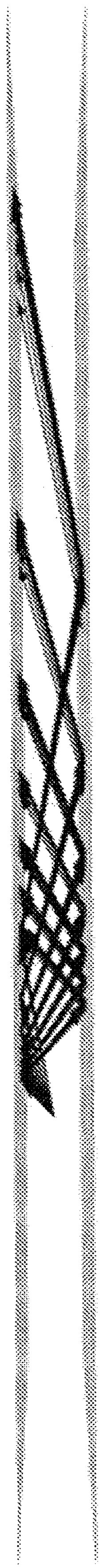
FIG. 7 illustrates an example side view of the rays that are propagating in the waveguide with a 30-degree angle of incidence variation and a 40-degree azimuthal spread.
Figure 8:
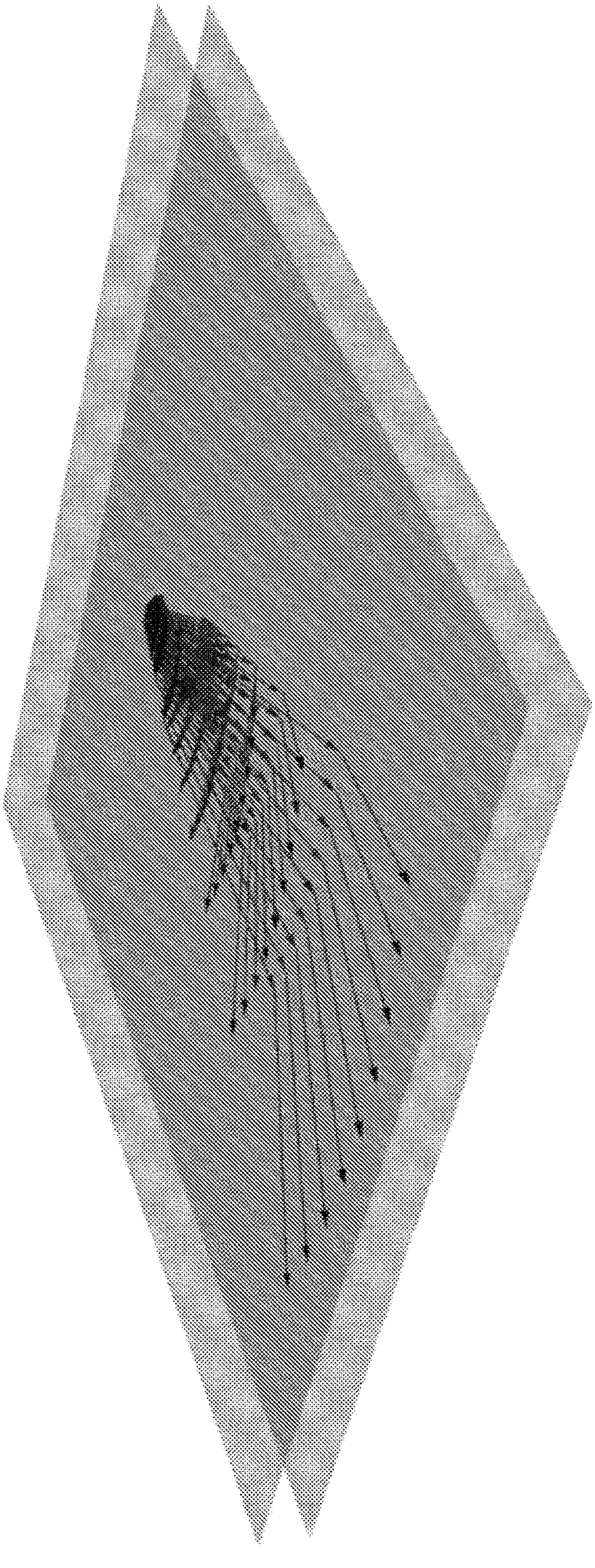
FIG. 8 illustrates a first azimuthal view for the example ray diagram of FIG. 7.
Figure 9:
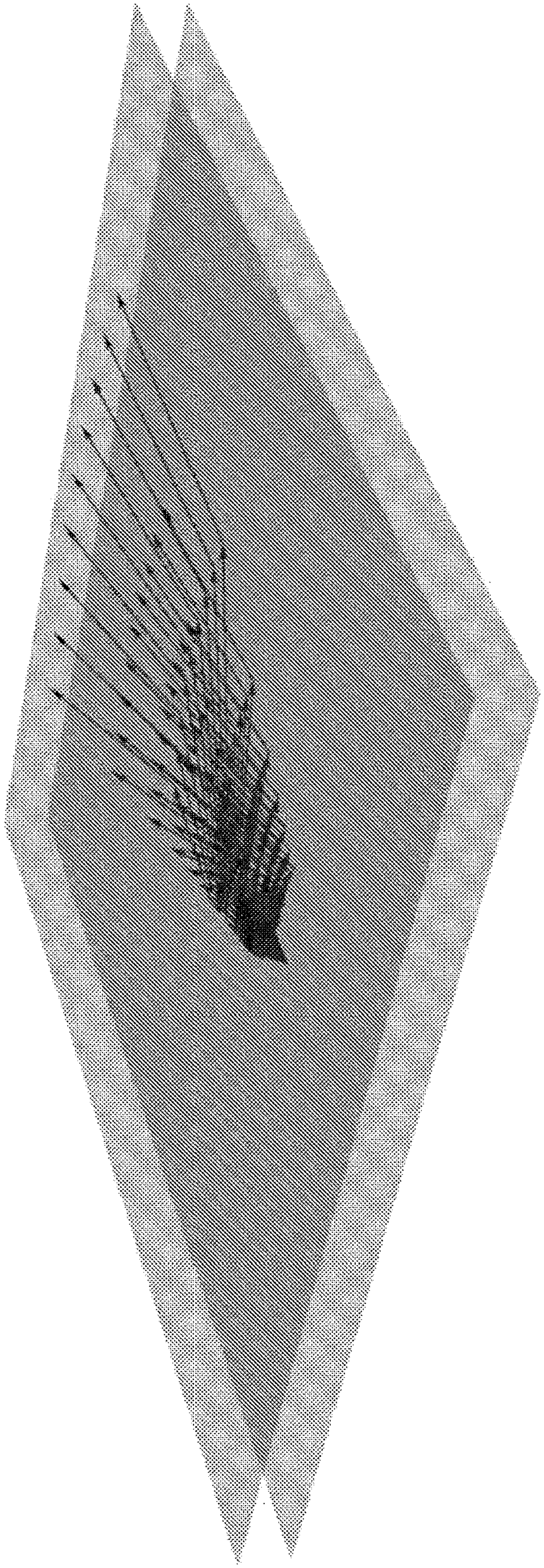
FIG. 9 illustrates a second azimuthal view for the example ray diagram of FIG. 7.
Figure 10:
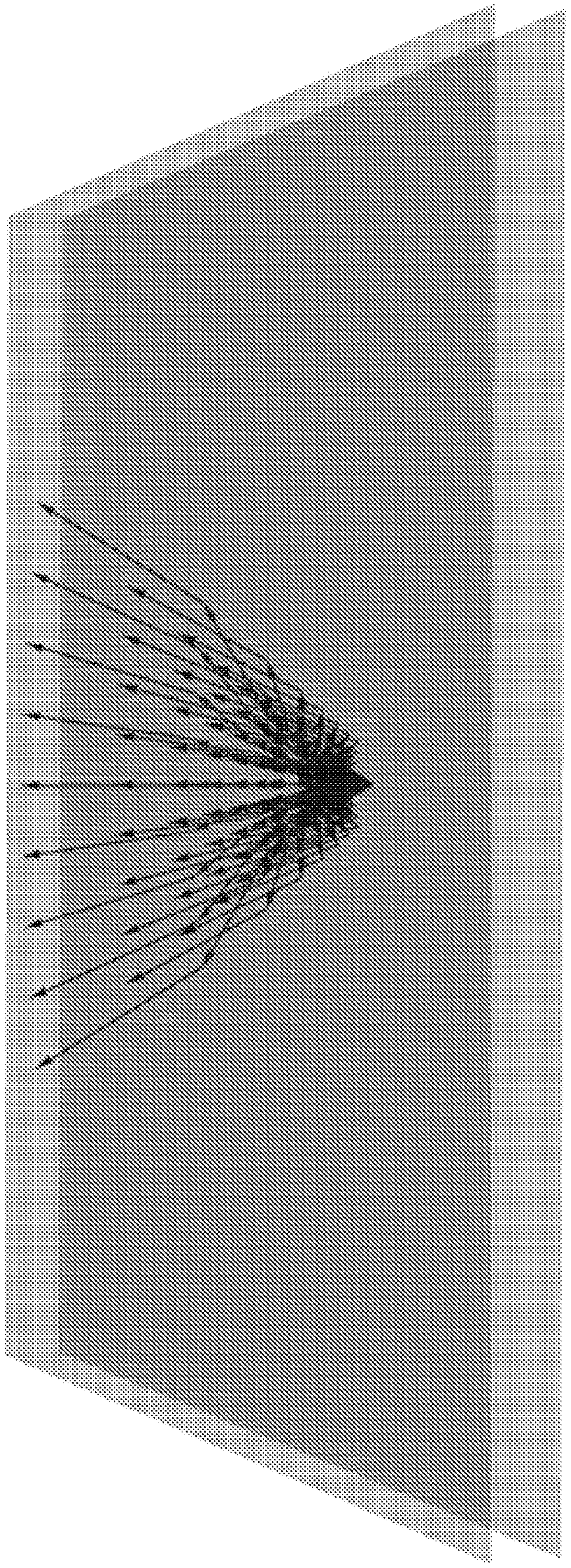
FIG. 10 illustrates a third azimuthal view for the example ray diagram of FIG. 7.

Further simulations were completed using Polaris-M ray-tracing software (Airy Optics Inc., Tucson, AZ). In these simulations, Polaris-M calculated and saved a complete polarization history for each ray. FIG. 6 shows an example of a single ray being traced through a waveguide with core index equal to 1.5 and cladding index equal to 1.0, illustrating TIR as the angle of incidence is greater than the critical angle. Additional rays were input to the system creating a 30-degree angle of incidence variation and a 40-degree azimuthal spread to better characterize the gradient index coating. Ray propagations at different perspectives for this calculation are shown in FIG. 7-10. FIG. 7 illustrates a side view of the rays that are propagating in the waveguide, and FIGS. 8-10 illustrate different associated azimuthal views. Polaris-M used the characteristics matrix method to calculate the reflection Fresnel amplitude coefficients, rather than the transfer matrix method; however, both methods yield the same result.

Figure 11:
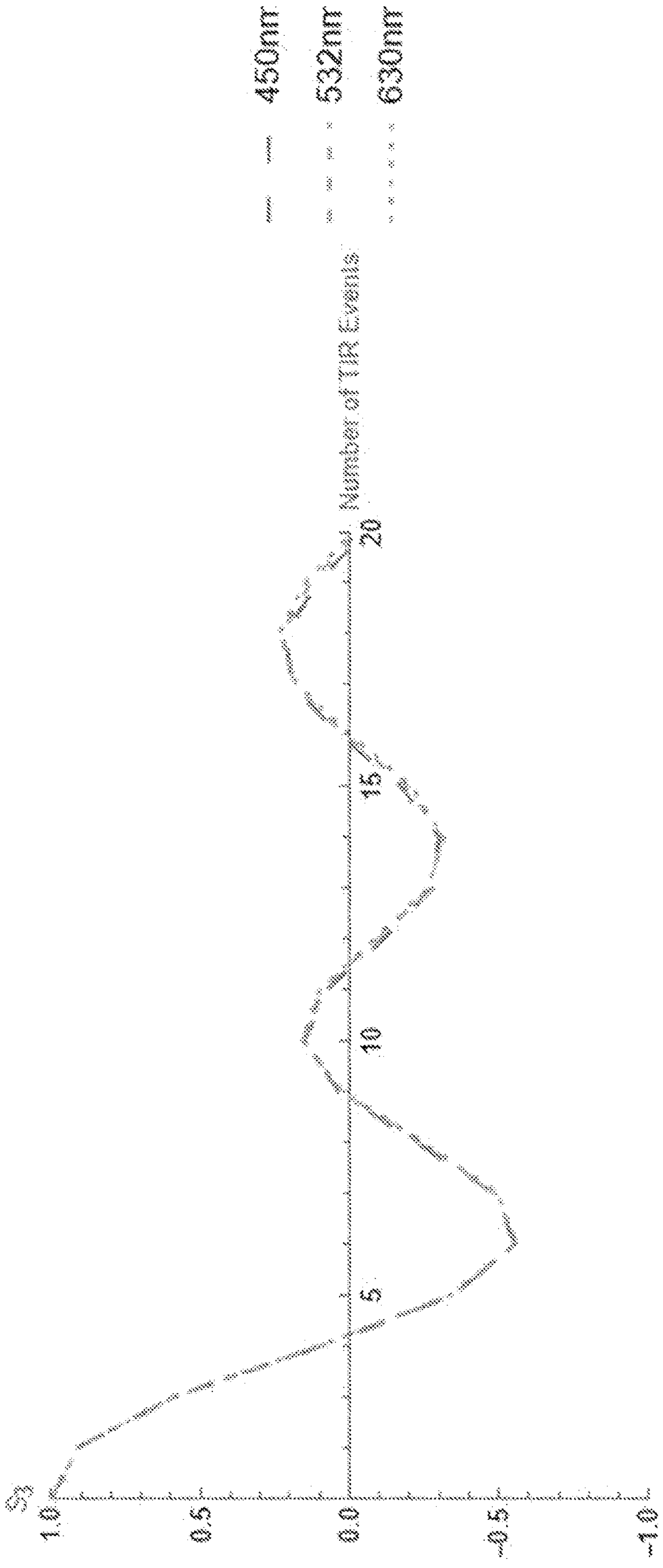
FIG. 11 illustrates an example plot of variations of a Stokes parameter in a configuration with no coating at three wavelengths, in which there is no control in the polarization state as the number of TIR events increases.
Figure 12:
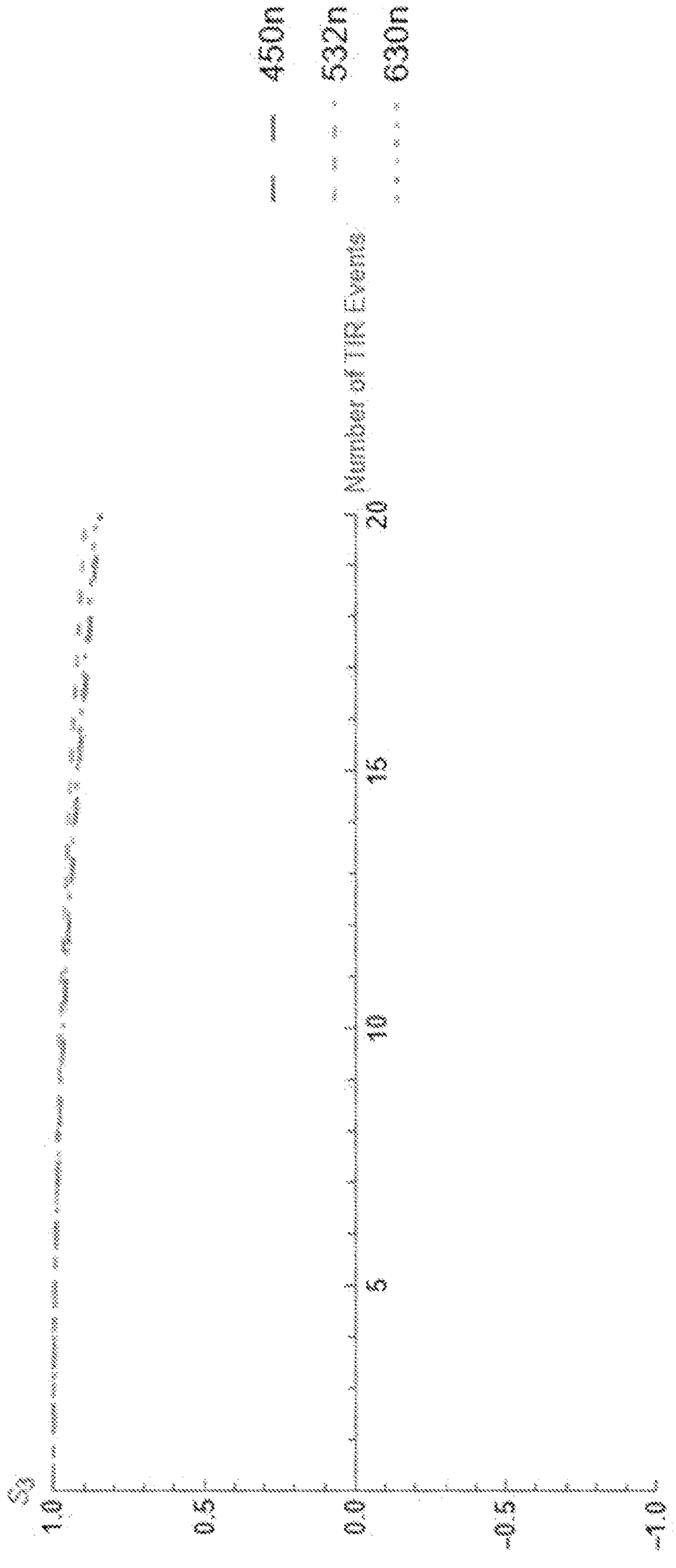
FIG. 12 illustrates the performance of an example gradient index coating at the same three wavelengths as in FIG. 11, in which the Stokes parameter is maintained close to 1 in accordance with the disclosed technology.

In many waveguide applications, the input light is circularly polarized. To quantify the performance of such a system, the $S_3$ Stokes parameter is tracked through the ray propagation calculation. For example, a system with ideal polarization control would show the $S_3$ parameter remaining equal to 1 after multiple reflections, (i.e., no change in the circular polarization occurs as the number of TIR events increases). FIG. 11 shows the variability of the $S_3$ Stokes parameter with no coating at three wavelengths (450 nm, 532 nm and 630 nm). There is no control of the polarization state as the number of TIR events increases, resulting in poor efficiency and low image quality. FIG. 12 shows the performance of 30-layer gradient index coating at the same three wavelengths as in FIG. 11. The plot in FIG. 12 illustrates that the $S_3$ parameter is maintained close to 1, providing excellent polarization control after multiple TIR events. As noted earlier, this performance is maintained over a large range of AOIs, using a graded index structure with multiple layers that can be formed from the same material and are characterized as having little to no dispersion in the visible region. Furthermore, unlike some existing polarization compensators that require differing construction parameters for every waveguide architecture and are highly sensitive to alignment, the graded index optical structures produced in accordance with the disclosed embodiments do not suffer from either of these problems and can be applied to any optical system that experiences TIR.

In some AR and VR display systems, the waveguide can be replaced by a beam splitter and/or a set of free form optics. In these cases, the graded index coating can be applied to the beam splitter, combiner, and free form optics to reduce the polarization effects of TIR. In other display systems, the waveguide can utilize transflective mirrors, surface relief gratings, or volumetric holographic gratings, to guide the light and expand/replicate the exit pupil of the optical system. All of the above methods utilize TIR for light propagation through the waveguide and therefore possess inherent polarization aberrations. The disclosed gradient index coatings correct these polarization aberrations, allowing for the highest output efficiency and image quality.

It should be noted that slab waveguides with claddings on both sides of the slab have been described herein to illustrate the principles of the disclosed technology. However, it is understood that the disclosed embodiments can be implemented in other waveguides, such as those with circular, cylindrical and even square/rectangular profiles with claddings that fully surround the internal core on all sides in the axial direction.

One aspect of the disclosed embodiments relates to a waveguide configured to reduce polarization aberrations. The waveguide includes a cladding having a first index of refraction, and a core positioned within the cladding and comprising a plurality of layers positioned adjacent to one another. The core is configured to accept a polarized beam incident on a facet and to maintain propagation of the polarized beam within the core upon multiple total internal reflections (TIRs). Each layer has an index of refraction that is larger than the first index of refraction, and the indices of refraction of the plurality of layers are selected to produce a core with a graded index profile that varies from a higher index of refraction at an inner location of the core to a lower index of refraction at an outer location of the core in vicinity of the cladding. Each layer consists of a low-dispersion material that results in no more than 10% loss in optical power when the polarized optical beam is propagating within the core. The waveguide is configured to consist of a predetermined number of layers as part of the core such that a polarization retardance associated with the polarized beam (a) for a range of angles of incidence spanning at least 6 degrees, and (b) after a plurality of TIRs is limited to less than 10 degrees. The low-dispersion material can be quantified to have no more than a 2% refractive index variation over the operating spectral bandwidth of the waveguide.

Figure 13:
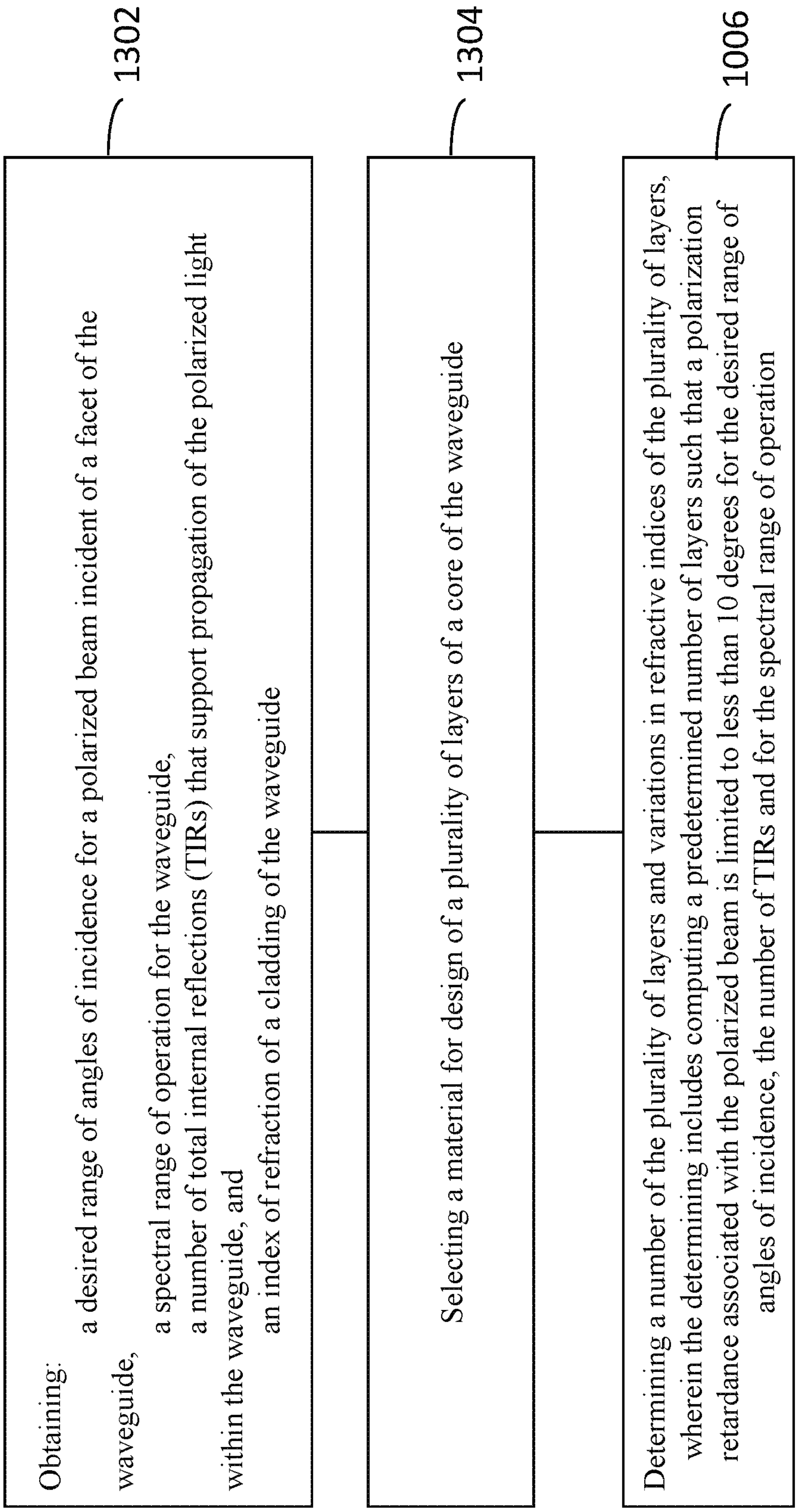
FIG. 13 illustrates a set of operations that can be performed to produce a waveguide having reduced polarization aberrations in accordance with an example embodiment.

FIG. 13 illustrates a set of operations that can be performed to produce a waveguide having reduced polarization aberrations in accordance with an example embodiment. At 1302, the following is obtained: a desired range of angles of incidence for a polarized beam incident of a facet of the waveguide, a spectral range of operation for the waveguide, a number of total internal reflections (TIRs) that support propagation of the polarized light within the waveguide, and an index of refraction of a cladding of the waveguide. At 1304, a material for design of a plurality of layers of a core of the waveguide is selected. At 1306, a number of the plurality of layers and variations in refractive indices of the plurality of layers are determined. These determinations include computing a predetermined number of layers such that a polarization retardance associated with the polarized beam is limited to less than 10 degrees for the desired range of angles of incidence, the number of TIRs and for the spectral range of operation.

In one example embodiment, the determinations include using a particular graded index variation profile that minimizes the number of layers. In another example embodiment, the particular graded index profile is one of a linear profile, sub-linear profile or a super-linear profile. In still another example embodiment, the desired range of angles of incidence is at least 30 degrees, the number of TIRs is at least 15, and the spectral range of operation is 450 nm to 650 nm. In yet another example embodiment, all of the plurality of layers comprise the same material and none of the plurality of layers is a dielectric layer, such as spatially varying metamaterials with non-insulating components. In one example embodiment, the material is a Teflon AF fluoropolymer. In another example embodiment, the variations in refractive indices of the plurality of layers are produced by selectively removing a small molecule material from each layer. In still another example embodiment, the variations in refractive indices of the plurality of layers is in the range 1.1 to 1.5 or 1.3 to 1.7. According to another example embodiment, the above noted method includes positioning the layers of the plurality of the layers on top of one another without performing an alignment procedure.

Another aspect of the disclosed embodiments relates to a waveguide configured to reduce polarization aberrations. The waveguide includes a cladding having a first index of refraction, and a core positioned within the cladding and comprising a plurality of layers positioned adjacent to one another. The core is configured to accept a polarized beam incident on a facet thereof and to maintain propagation of the polarized beam within the core upon multiple total internal reflections (TIRs). Each layer has an index of refraction that is larger than the first index of refraction, and the indices of refraction of material of the plurality of layers are selected to produce a core with a graded index profile that varies from a higher index of refraction at an inner location of the core to a lower index of refraction at an outer location of the core in vicinity of the cladding. Additionally, the waveguide is configured to consist of a predetermined number of layers as part of the core such that a polarization retardance associated with the polarized beam (a) for a range of angles of incidence spanning at least 6 degrees, and (b) after a plurality of TIRs is limited to less than 10 degrees.

In one example embodiment, the range of angles of incidence spans a range having a lower value that is equal to a critical angle associated with the waveguide and an upper value that is at least 89 degrees. In another example embodiment, the plurality of TIRs includes at least 15 TIRs. In yet another example embodiment, the graded index profile varies according to a linear index variation profile. In still another example embodiment, the graded index profile varies according to a non-linear index variation profile. In one example embodiment, the graded index profile varies according to one of a sub-linear or a super-super linear index variation profile.

According to another example embodiment, the predetermined number of layers is selected in accordance with a particular graded index profile variation that produces a lower retardance value compared to a retardance value produced when a different graded index profile variation is selected with the same number of layers. In another example embodiment, the predetermined number of layers produces the lower retardance value in the range of the angles of incidence. In still another example embodiment, the material of the layers and the predetermined number of layers are selected to limit the polarization retardance to less than 10 degrees for a spectral range of the polarized beam from 450 nm to 650 nm. In yet another example embodiment, the polarized beam comprises a circularly polarized beam and the degree of circular polarization of the polarized beam is maintained at 85 percent or more after 20 TIRs.

In one example embodiment, all of the layers comprise the same material and none of the plurality of layers is a dielectric layer, examples of which include spatially varying metamaterials with non-insulating components. In another example embodiment, the material is a Teflon AF fluoropolymer. In still another example embodiment, the retardance is limited to less than 10 degrees in a visible range of spectrum from 450 nm to 650 nm. In yet another example embodiment, the waveguide is a slab waveguide and the cladding includes a first cladding that is positioned on a first side of the core and a second cladding that is positioned on a second side of the core.

In another example embodiment, the waveguide has a substantially cylindrical shape that cladding surrounds the core. In still another example embodiment, the refractive index of the graded index profile varies from (a) 1.1 to 1.5, or (b) 1.3 to 1.7. In yet another example embodiment, the waveguide is part of a refractive display system. In one example embodiment, the layers are positioned on top of one another without requiring an alignment procedure. In another example embodiment, the material in each layer is selected to produce no more than 10% loss in optical power when the polarized optical beam is propagating within the core after multiple TIRs.

It is understood that the various disclosed embodiments may be implemented individually, or collectively, using devices comprised of various optical components, electronics hardware and/or software modules and components. These devices, for example, may comprise a processor, a memory unit, an interface that are communicatively connected to each other, and may range from desktop and/or laptop computers, to mobile devices and the like. The processor and/or controller can perform various disclosed operations based on execution of program code that is stored on a storage medium. The processor and/or controller can, for example, be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. For example, the processor may be configured to determine the numbers and thicknesses of the layers in the graded index structure for a range of AOIs, a particular range of wavelengths, particular profiles of index variations, and/or or particular constituent material properties of the layers.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

We claim:

1. A waveguide configured to reduce polarization aberrations, the waveguide comprising:

a cladding having a first index of refraction; and a core positioned within the cladding and comprising a plurality of layers positioned adjacent to one another, the core configured to accept a polarized beam incident on a facet thereof and to maintain propagation of the polarized beam within the core upon multiple total internal reflections (TIRs), wherein:

each layer has an index of refraction that is larger than the first index of refraction, the indices of refraction of material of the plurality of layers are selected to produce a core with a graded index profile that varies from a higher index of refraction at an inner location of the core to a lower index of refraction at an outer location of the core in vicinity of the cladding, and the waveguide is configured to consist of a predetermined number of layers as part of the core such that a polarization retardance associated with the polarized beam (a) for a range of angles of incidence spanning at least 6 degrees, and (b) after a plurality of TIRs is limited to less than 10 degrees.

2. The waveguide of claim 1, wherein the range of angles of incidence spans a range having a lower value that is equal to a critical angle associated with the waveguide and an upper value that is at least 89 degrees.

3. The waveguide of claim 1, wherein the plurality of TIRs includes at least 15 TIRs.

4. The waveguide of claim 1, wherein the graded index profile varies according to a linear index variation profile.

5. The waveguide of claim 1, wherein the graded index profile varies according to a non-linear index variation profile.

6. The waveguide of claim 5, wherein the graded index profile varies according to one of a sub-linear or a super-super linear index variation profile.

7. The waveguide of claim 1, wherein the predetermined number of layers is selected in accordance with a particular graded index profile variation that produces a lower retardance value compared to a retardance value produced when a different graded index profile variation is selected with the same number of layers.

8. The waveguide of claim 7, wherein the predetermined number of layers produces the lower retardance value in the range of the angles of incidence.

9. The waveguide of claim 1, wherein the material of the layers and the predetermined number of layers are selected to limit the polarization retardance to less than 10 degrees for a spectral range of the polarized beam from 450 nm to 650 nm.

10. The waveguide of claim 1, wherein the polarized beam comprises a circularly polarized beam and a degree of circular polarization of the polarized beam is maintained at 85 percent or more after 20 TIRs.

11. The waveguide of claim 1, wherein all of the layers comprise the same material and none of the plurality of layers is a dielectric layer.

12. The waveguide of claim 11, wherein the material is a Teflon AF fluoropolymer.

13. The waveguide of claim 1, wherein the retardance is limited to less than 10 degrees in a visible range of spectrum from 450 nm to 650 nm.

14. The waveguide of claim 1, wherein the waveguide is a slab waveguide and wherein the cladding includes a first cladding that is positioned on a first side of the core and a second cladding that is positioned on a second side of the core.

15. The waveguide of claim 1, wherein the waveguide has a substantially cylindrical shape that cladding surrounds the core.

16. The waveguide of claim 1, wherein the indices of refraction of the graded index profile varies from (a) 1.1 to 1.5, or (b) 1.3 to 1.7.

17. The waveguide of claim 1, wherein the waveguide is part of a refractive display system.

18. The waveguide of claim 1, wherein the layers are positioned on top of one another without requiring an alignment procedure.

19. The waveguide of claim 1, wherein the material in each layer is selected to produce no more than 10% loss in optical power when the polarized beam is propagating within the core after multiple TIRs.

20. A method for producing a waveguide having reduced polarization aberrations, the method comprising:

obtaining:

a desired range of angles of incidence for a polarized beam incident of a facet of the waveguide, a spectral range of operation for the waveguide, a number of total internal reflections (TIRs) that support propagation of the polarized beam within the waveguide, and an index of refraction of a cladding of the waveguide; and selecting a material for design of a plurality of layers of a core of the waveguide; and determining a number of the plurality of layers and variations in refractive indices of the plurality of layers, wherein the determining comprises computing a predetermined number of layers such that a polarization retardance associated with the polarized beam is limited to less than 10 degrees for the desired range of angles of incidence, the number of TIRs and for the spectral range of operation.

21. The method of claim 20, wherein the determining comprises using a particular graded index variation profile that minimizes the number of layers.

22. The method of claim 21, wherein the particular graded index variation profile is one of a linear profile, sub-linear profile or a super-linear profile.

23. The method of claim 20, wherein the desired range of angles of incidence is at least 30 degrees, the number of TIRs is at least 15, and the spectral range of operation is 450 nm to 650 nm.

24. The method of claim 20, wherein all of the plurality of layers comprise the same material and none of the plurality of layers is a dielectric layer.

25. The method of claim 24, wherein the material is a Teflon AF fluoropolymer.

26. The method of claim 24, wherein the variations in refractive indices of the plurality of layers are produced by selectively removing a small molecule material from each layer.

27. The method of claim 20, wherein the variations in refractive indices of the plurality of layers is in a range 1.1 to 1.5 or 1.3 to 1.7.

* * * * *